(12) United States Patent
Baskakov et al.

(10) Patent No.: US 9,298,377 B2
(45) Date of Patent: Mar. 29, 2016

(54) TECHNIQUES FOR REDUCING READ I/O LATENCY IN VIRTUAL MACHINES

(71) Applicant: VMware, Inc., Palo Alto, CA (US)

(72) Inventors: Yury Baskakov, Newton, MA (US);
Kapil Arya, Boston, MA (US);
Alexander Thomas Garthwaite, Hamilton, MA (US)

(73) Assignee: VMware, Inc., Palo Alto, CA (US)

( * ) Notice: Subject to any disclaimer, the term of this patent is extended or adjusted under 35 U.S.C. 154(b) by 217 days.

(21) Appl. No.: 14/265,036

(22) Filed: Apr. 29, 2014

(65) Prior Publication Data

US 2015/0309735 A1  Oct. 29, 2015

(51) Int. Cl.
*G06F 12/06* (2006.01)
*G06F 3/06* (2006.01)
*G06F 12/10* (2006.01)
*G06F 9/455* (2006.01)

(52) U.S. Cl.
CPC ............ *G06F 3/0611* (2013.01); *G06F 3/0647* (2013.01); *G06F 3/0664* (2013.01); *G06F 3/0685* (2013.01); *G06F 9/45533* (2013.01); *G06F 12/109* (2013.01); *G06F 12/1081* (2013.01); *G06F 2212/657* (2013.01)

(58) Field of Classification Search
CPC ... G06F 3/0611; G06F 3/0685; G06F 3/0647; G06F 3/0664; G06F 9/45533; G06F 12/1081; G06F 12/109; G06F 2212/657
See application file for complete search history.

(56) References Cited

U.S. PATENT DOCUMENTS

| | | |
|---|---|---|
| 5,694,571 A | 12/1997 | Fuller |
| 2008/0065825 A1 | 3/2008 | Fang et al. |
| 2010/0299667 A1 | 11/2010 | Ahmad et al. |
| 2011/0161620 A1 | 6/2011 | Kaminski et al. |
| 2012/0324181 A1 | 12/2012 | Garthwaite et al. |

OTHER PUBLICATIONS

U.S. Appl. No. 14/265,062, filed Apr. 29, 2014 entitled "Techniques for Reducing Read I/O Latency in Virtual Machines".

*Primary Examiner* — John Lane

(57) ABSTRACT

A computer implemented method for reducing the latency of an anticipated read of disk blocks from a swap file in a virtualized environment. First, the method identifies a sequence of disk blocks that was written in a guest swap file. The method then detects a first reference within the sequence of blocks that references a first disk block stored in a host swap file and a second reference within the sequence of blocks that references a second disk block stored in the host swap file. The method then moves the second disk block to a location in a host swap file that is adjacent to the first disk block. In some examples, the first block and second block are both moved to a new location in the host swap file where they are adjacent to one another.

27 Claims, 6 Drawing Sheets

TECHNIQUES FOR REDUCING READ I/O LATENCY IN VIRTUAL MACHINES

CROSS REFERENCE

This application incorporates by reference U.S. patent application Ser. No. 13/448,291, filed Apr. 16, 2012, entitled "Detecting And Suppressing Redundant Input-Output Operations," which claims priority U.S. Provisional Patent Application Ser. No. 61/475,607, filed Apr. 14, 2011, entitled "Reconciling Guest and Virtual Machine Monitor (VMM) Swapping in a Virtual Machine." This application is also related to commonly assigned U.S. patent application Ser. No. 14/265,062, filed concurrently with the present application, entitled "Techniques for Reducing Read I/O Latency in Virtual Machines." The entire contents of these related applications are incorporated herein by reference for all purposes.

BACKGROUND

In multi-level scheduling of memory between virtual machines (VMs) and the virtualization software (also known as a "hypervisor"), double-paging is a common issue that arises when a sequence of events occur. Double paging occurs when a VM wishes to reclaim the VM's memory and thus moves content from the VM's memory out to a guest swap file. This is also known as "paging" the content out to the guest swap file. If the content being paged out includes references to the hypervisor's memory and the hypervisor has previously moved the referenced content from the hypervisor's memory to a host swap file for purposes of reclaiming hypervisor memory, then we run into a double-paging problem. For example to page the content out to the guest swap file, the content stored in the host swap file must first be swapped back into the hypervisor's memory and second be paged out to the guest swap file. This is a time consuming process. One solution to address this issue is to allow the hypervisor to access content on both the guest swap file and the host swap file. However, this technique can result in increased read input/output (I/O) latency since the hypervisor may need to request content from multiple swap files, and sometimes has to perform multiple read requests to the same swap file.

DETAILED DESCRIPTION

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Techniques are described for reducing the read I/O latency in virtual machines (VMs), particularly a VM having content stored across multiple swap files. A guest OS running inside a VM can store guest content in a guest swap file and a host swap file. The guest swap file can be part of a virtual machine disk (VMDK). The host swap file can be part of another VMDK. In one specific example, the other VMDK is a block-swap store (BSST) belonging to the virtualization software (also known as a "hypervisor"). The VM can include a first VMDK and the host swap file can include a second VMDK that is a peer of the first VMDK. The host swap file can be a VMDK that is a peer of the guest operating system.

The techniques described herein reorganize the guest content in the guest swap file and the host swap file to reduce the number of I/O requests needed when retrieving the guest content for the guest OS. One technique describes the virtualization software reorganizing the guest content in the guest swap file by copying disk blocks from the host swap file that contain the guest content back into the guest swap file. Another technique describes the virtualization software moving guest content in the host swap file so that the guest content is stored as adjacent disk blocks in the host swap file. This can reduce the number of I/O requests required when retrieving the guest content in a future read I/O request. In some examples, the virtualization software can select a reorganization technique to apply according to system conditions, such as the current load on the virtualization software, load on physical disk, and load on the I/O subsystem. In other examples, the virtualization software can select a point in time to start the reorganization technique based on the system conditions or on a predefined interval. Since reorganization places extra pressure on the I/O subsystem and system resources, the virtualization software may communicate with I/O scheduler and monitoring system to determine the best time to perform the techniques. For instance, reorganization can be delayed until a later point in time when there is a shortage of resources.

Figure 1:
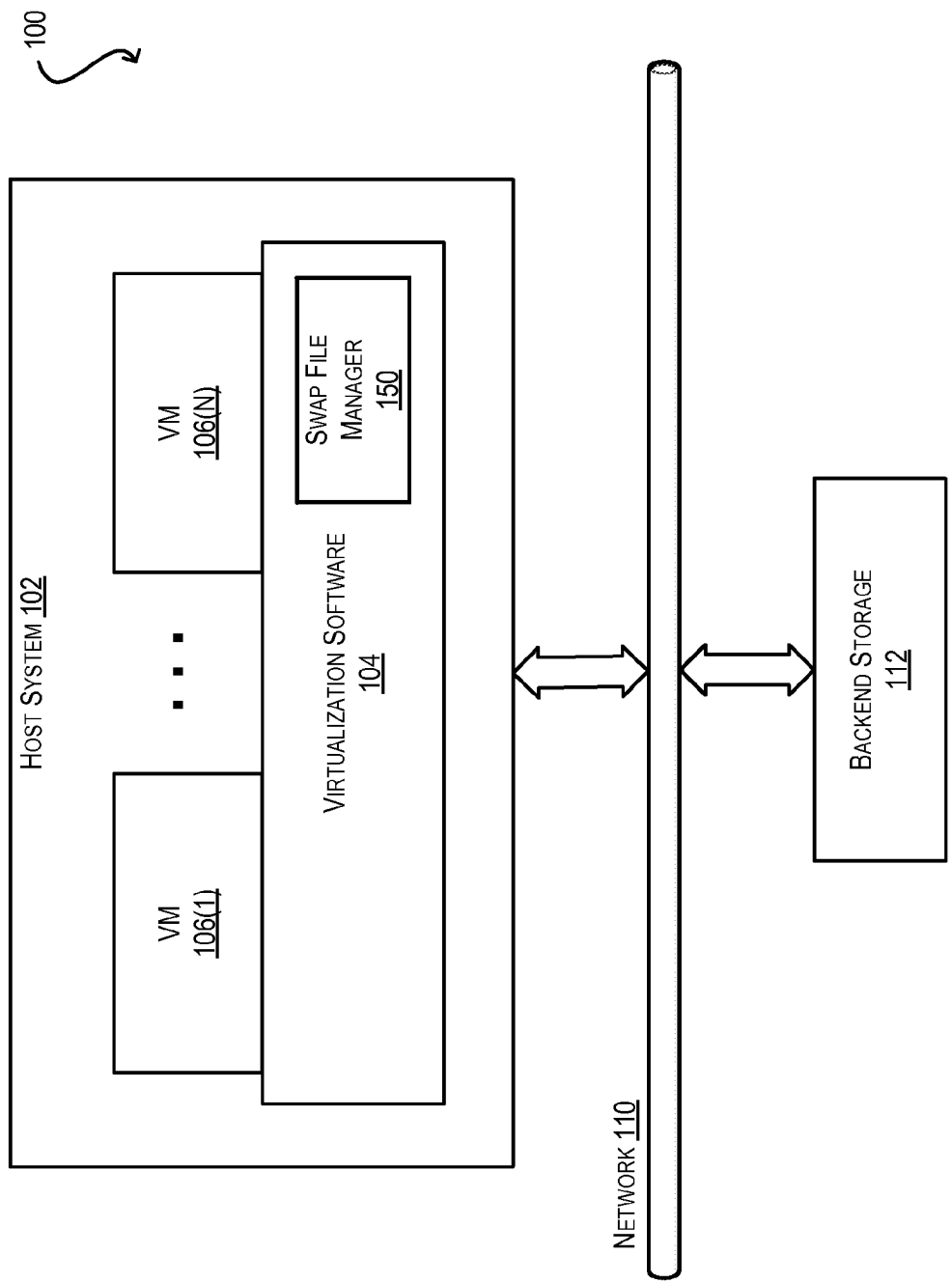
FIG. 1 depicts an example of a virtual infrastructure for managing content stored in swap files according to one embodiment.

FIG. 1 depicts an example of a virtual infrastructure 100 for managing content stored in swap files according to one embodiment. As shown, virtual infrastructure 100 includes a host system 102 that executes virtualization software 104. Virtualization software 104 is a software layer that provides an environment in which one or more deployed VMs 106(1)-106(N) can run. In one embodiment, virtualization software 104 can interact directly with the hardware platform of host system 102 without an intervening host operating system. In this embodiment, virtualization software 104 can include a kernel (not shown) that manages VM use of the various hardware devices of host system 102. In an alternative embodiment, virtualization software 104 can be part of a "hosted" configuration in which virtualization software 104 runs on top of a host operating system (not shown). In this embodiment, virtualization software 104 can rely on the host operating system for physical resource management of hardware devices. One of ordinary skill in the art will recognize various modifications and alternatives for the design and configuration of virtualization software 104.

Each VM 106(1)-106(N) running on host system 102 can execute a guest OS and one or more software applications (e.g., databases, business applications, etc.). In one embodiment, the one or more software applications can correspond to one or more software services that the owner/administrator of virtual infrastructure 100 offers to remote users (e.g., customers). The software code (e.g., binaries, configuration files, etc.) for the guest OS and the one or more software applications can be maintained in virtual disks, or "VMDKs," that are stored in a backend storage device, such as backend storage 112. In some examples, the VMDKs may include swap files. The guest OS can use the swap file to simulate extra memory. For example, a guest OS can page disk blocks out to a guest swap file to free up memory for other programs or tasks.

To page in guest content for a guest OS running on VM 106(1), the virtualization software 104 can generate a plurality of read requests to retrieve a portion of the guest content from a swap file in backend storage 112. The swap file can be a host swap file that corresponds with the host OS or can be a guest swap file that corresponds with a guest OS. When the content to be retrieved is stored in contiguous blocks, virtualization software 104 may use one read request to retrieve the content in the contiguous blocks. However, when the content is stored in non-contiguous blocks, virtualization software 104 may have to use multiple read requests for each non-contiguous portion. Using multiple read requests may increase read I/O latency because processing of multiple read requests generally takes longer than processing of one read request. To address the above, swap file manager 150 can reorganize the guest content stored in the host swap file and/or the guest swap file to reduce the number of read requests needed to retrieve the guest content, thus reducing the read I/O latency for requests to retrieve the guest content. Reorganization techniques to reduce read I/O latency as described below may include moving non-contiguous blocks in a swap file into a contiguous position with other blocks in the swap file or migrating blocks in one swap file into another swap file.

Figure 2:
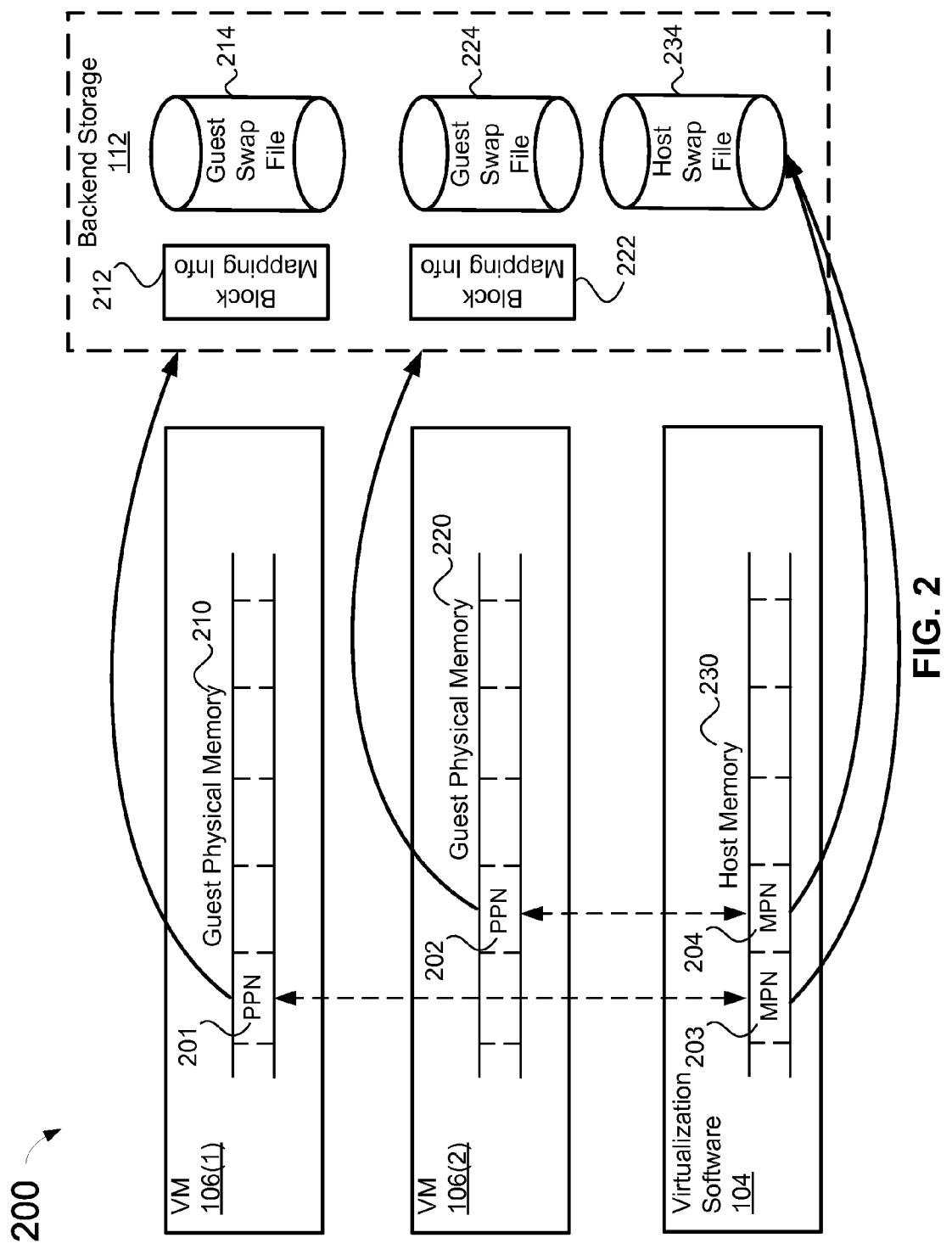
FIG. 2 depicts an example of a virtual infrastructure according to one embodiment.

FIG. 2 depicts an example of a virtual infrastructure 200 according to one embodiment. System 200 includes VM 106(1), VM 106(2), and virtualization software 104. VM 106(1) includes a guest OS (not shown) and guest physical memory 210. The guest OS of VM 106(1) can store guest content for VM 106(1) as a sequence of disk blocks in guest physical memory 210. Here, a sequence of disk blocks have been stored in a physical page of VM 106(1) referred to by physical page number (PPN) 201. Similarly, VM 106(2) includes a guest OS (not shown) and guest physical memory 220. The guest OS of VM 106(2) can store guest content for VM 106(2) as another sequence of disk blocks in guest physical memory 220. Here, another sequence of disk blocks have been stored in PPN 202, a physical page for 106(2). As described here, each page can be a multiple disk block size. In other embodiments, each page can be a single disk block size, thus resulting in each page storing a single disk block.

The host OS running virtualization software 104 also includes host memory 230. Virtualization software 104 can store content in host memory 230, including guest content that is referenced by guest physical memory 210 and 220. This allows a portion of the guest content to be stored by virtualization software 104, thus freeing up available resources on the respective VMs. Here, a disk block within PPN 201 references a machine page on host memory 230 referred to by a machine page number (MPN) 203 and a disk block of PPN 202 references a MPN 204 (a machine page on host memory 230). Thus, MPN 203 stores content that is referenced in PPN 201 and MPN 204 stores content that is referenced in PPN 202. In other examples, the number of machine pages that contain references to guest physical memory 210 and guest physical memory 220 can vary.

Backend storage 112 includes guest swap file 214 and guest swap file 224 which are configured to store guest content for VM 106(1) and 106(2), respectively. Guest content can be paged out to a guest swap file to free up resources in the corresponding VM. Backend storage 112 also includes host swap file 234 which is configured to store guest content paged out by the host OS. For example when host memory 230 is low, virtualization software 104 can page out MPN 203 or MPN 204 to host swap file 234. Backend storage 112 further includes block mapping info 212 that corresponds to guest swap file 214 and block mapping info 222 that corresponds with guest swap file 224. Each block mapping info is configured to store information that allows virtualization software 104 to locate and retrieve guest content that is stored in host swap file 234. For example, block mapping info 212 can store information that redirects a block from guest swap file 214 to one or more blocks in host swap file 234. As another example, block mapping info 212 can store information that redirects a block from guest physical memory 210 to one or more blocks in host swap file 234.

System 200 may use various techniques to more efficiently use memory. For example, virtualization software 104 may "swap" machine pages from host memory 230 into the host swap file 234 or virtualization software 104 may "page" guest physical pages from guest physical memory 210 to guest swap file 214. Although the memory may be freed up, some content may not be stored in contiguous blocks due to the paging or swapping. As a result, virtualization software 104 may have to perform multiple read requests to retrieve the content from non-contiguous disk blocks when a VM 106 wants to read content that has been swapped or paged. The following will describe swapping and paging, and then techniques for reducing the number of read requests for swapped or paged content.

Virtualization software 104 can periodically copy guest content stored in a machine page on host memory 230 into host swap file 234 to free up space in host memory 230. This is known as "swapping" the machine page into host swap file 234. After guest content has been swapped into host swap file 234, virtualization software 104 can update a block mapping table to store the new location of the guest content in host swap file 234. This allows the references to the guest content to be maintained. Changes to references of VM 106(1) can be stored in block mapping info 212 and changes to references of VM 106(2) can be stored in block mapping info 222.

Here, virtualization software 104 has swapped MPN 203 and 204 into host swap file 234 (e.g., copied the contents of MPN 203 and 204 into blocks of host swap file 234). Virtualization software 104 can check whether the contents of MPN 203 are already stored in host swap file 234. If the contents of MPN 203 already exist in a disk block of host swap file 234, virtualization software 104 can increment a reference count associated with the disk block to signify that the disk block is referenced one additional time. Virtualization software 104 can use the reference count to track the number of times that disk blocks belonging to VM 106(1) or VM 106(2) reference the disk block. This allows virtualization software 104 to determine when a disk block within host swap 234 is no longer being referenced by the VMs and thus can be cleared and repurposed. Swapping can also include updating block mapping info 212 of VM 106(1) or block mapping info 222 of VM 106(2) so that mappings between physical pages of guest physical memory 210 and guest physical memory 220 remain intact.

VM 106(1) can periodically copy the contents of a physical page from guest physical memory 210 into guest swap file 214 to free up space in guest physical memory 210. This is known as "paging" the physical page into guest swap file 214. Similarly, VM 106(2) can page the contents of a physical page of guest physical memory 220 into guest swap file 224. In some embodiments, virtualization software 104 can update block mapping info 212 to maintain the mapping between PPN 201 and the contents of MPN 203 stored in host swap file 234. Although the associations between the guest content are maintained, multiple read requests can be required when performing the read since the guest content may need to be retrieved from both guest swap file 214 and host swap file 234.

When VM 106(1) requests to page out PPN 201, virtualization software 104 can intercept the page out request and inspect whether any blocks within PPN 201 reference content that has already been swapped out to host swap file 234. For example, a block within PPN 201 references MPN 203, which has already been swapped out to host swap file 234. If virtualization software 104 detects that the referenced content (e.g., MPN 203) has already been swapped out to the host swap file 234, virtualization software 104 can update a reference count for the referenced content stored in host swap file 234, update block mapping info 212 to link the reference to the referenced content stored in host swap file 234, and notify VM 106(1) that one or more blocks of PPN 201 have been previously swapped out. Upon receiving the notification, VM 106(1) can page out guest content from PPN 201 to guest swap file 214. VM 106(1) can issue a write I/O to write the guest content of PPN 201 to guest swap file 214 and can issue dummy writes of dummy blocks. The dummy blocks can reference guest content stored in host swap file 234 according to block mapping info 212. Due to paging and swapping, content stored in guest swap file 214 can reference disk blocks in host swap file 234. Each non-contiguous (i.e., non-adjacent) group of disk blocks in host swap 234 that are referenced in guest swap file 214 can require an additional read request to retrieve the content. As a result, retrieving content in guest swap file 214 can require a read request to guest swap file 214 and one or more read requests to host swap file 234. As described here, the page size can equal multiple disk blocks and thus can store multiple disk blocks. In other embodiments, the page size can equal the disk block and thus PPN 201 represents a single disk block. If the contents of PPN 201 already exist in host swap file 234, then VM 106(1) can issue a dummy write of a dummy block to guest swap file 214.

Figure 3A:
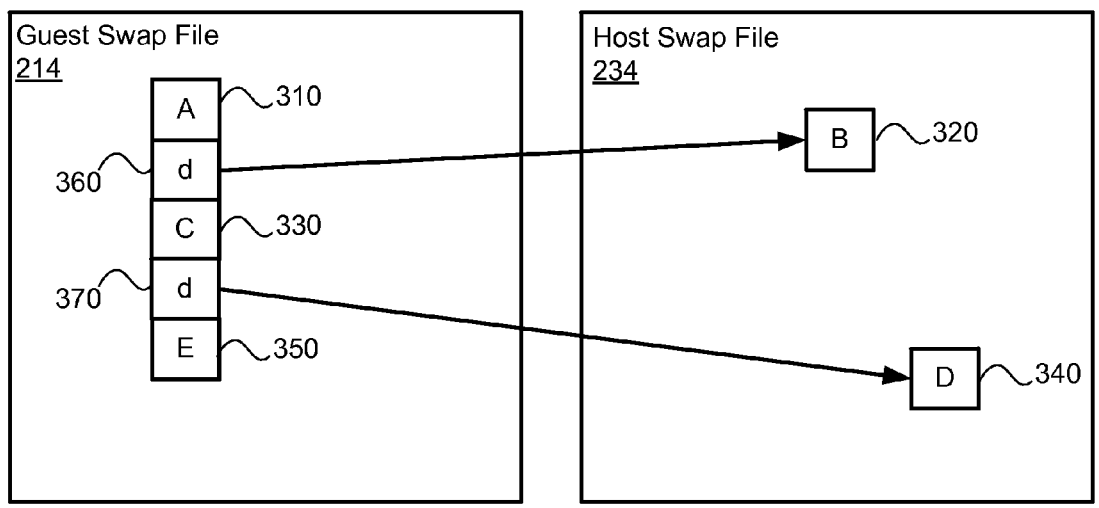
FIG. 3A depicts an example of content stored within a guest swap file and a host swap file of the backend storage according to one embodiment.
Figure 3B:
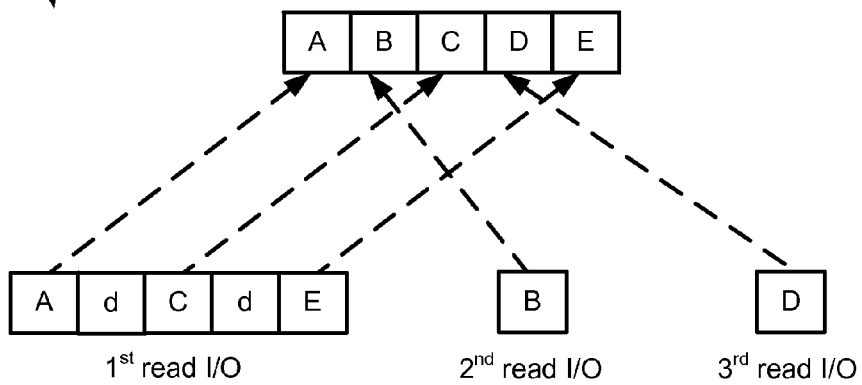
FIG. 3B depicts an example illustrating the results of multiple read I/Os according to one embodiment.
Figure 3C:
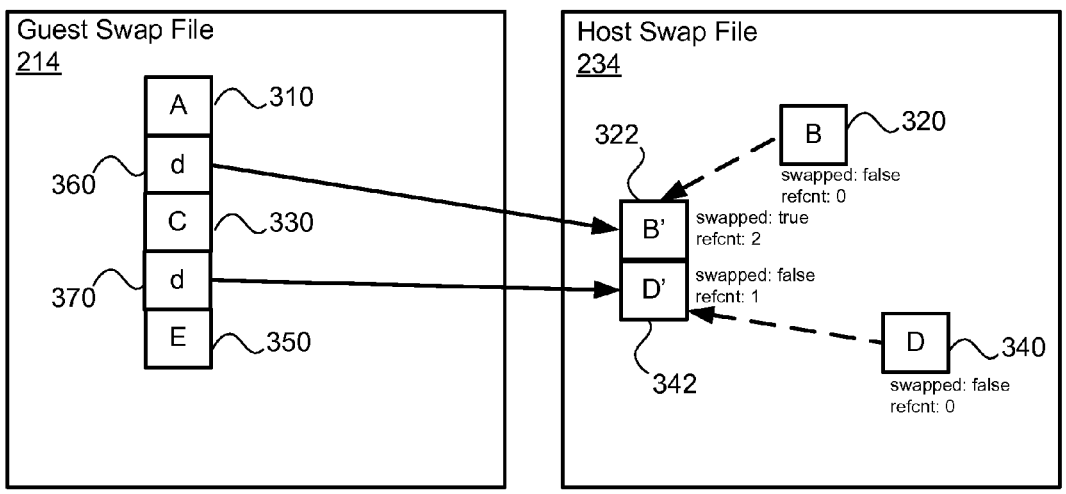
FIG. 3C depicts an example illustrating a technique for reorganizing content in the host swap file according to one embodiment.
Figure 3D:
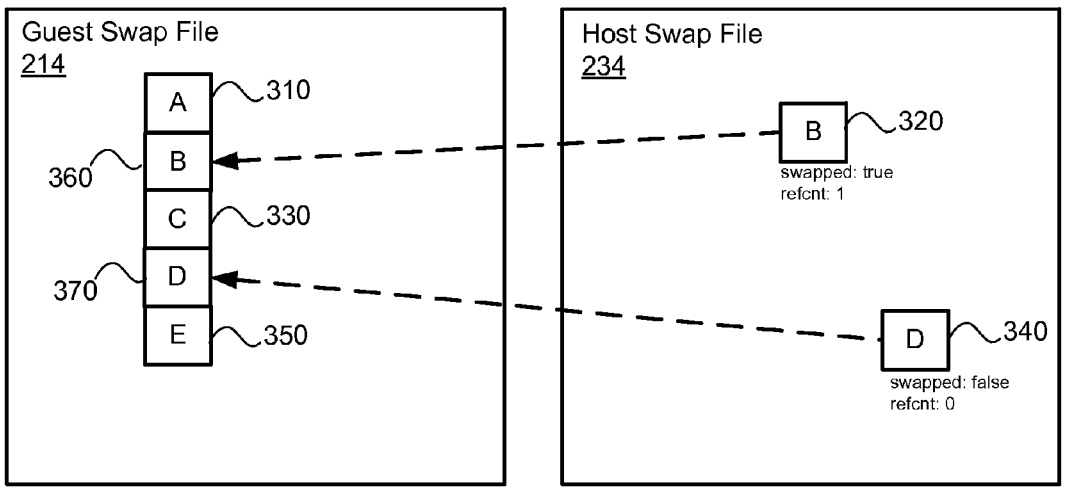
FIG. 3D depicts an example illustrating a technique for reorganizing content in the guest swap file according to one embodiment.

The following describes the process of reading from non-contiguous blocks in FIGS. 3A and 3B. FIGS. 3C and 3D then describe different methods of reducing read I/O latency once the non-contiguous blocks are recognized.

FIG. 3A depicts an example of content stored within guest swap file 214 and host swap file 234 of backend storage 112 according to one embodiment. Here, a guest VM write operation resulted in five disk blocks written into guest swap file 214 of backend storage 212. Blocks 310, 360, 330, 370, and 350 are stored in guest swap file 214 as contiguous blocks that can be retrieved using a single read I/O. Blocks 360 and 370 store a dummy page since the content within these blocks was previously swapped to host swap file 234 by virtualization software 104.

When virtual software 104 receives a read request for blocks 310, 360, 330, 370, and 350, virtualization software 104 uses block mapping info 212 to determine that block 360 references block 320 in host swap file 234 and block 370 references block 340 in host swap file 234. Here, virtualization software 104 cannot use one read request to retrieve the blocks due to the swapping of blocks 360 and 370. In this case, virtualization software 104 performs three read requests to retrieve the content. Virtualization software 104 performs a first read request on guest swap file 214 to retrieve blocks 310, 360, 330, 370, and 350. Virtualization software 104 then determines that one or more blocks received in the first read request reside in host swap file 234. Here, virtualization software 104 may determine that the contents for block 360 and 370 reside in host swap 234 using various methods. For example, in one embodiment, virtualization software 104 determines that the contents for block 360 and 370 reside in host swap file 234 based on the dummy pages. In this example, block 360 can store an indirection that when hashed by block mapping info 212, returns block 320 in host swap file 234. In another embodiment, virtualization software 104 determines that the contents for block 360 and 370 reside in host swap file 234 based on block mapping info 212. Block mapping info 212 can map addresses within guest swap file 214 to addresses within host swap file 234. Once it is determined that part of the contents are stored in host swap file 234, virtualization software 104 performs a second read request on host swap file 234 to retrieve block 320 and a third read request on host swap file 234 to retrieve block 340. Two separate read requests are necessary since blocks 320 and 340 are not contiguously stored with blocks 310, 330, and 350 in guest swap file 214. Further, blocks 320 and 340 are stored non-contiguously in host swap file 234.

FIG. 3B depicts an example illustrating the results of multiple read I/Os according to one embodiment. As shown here, a first read I/O returns a sequence of contiguous blocks. Two of the contiguous blocks are dummy blocks. The second read I/O returns a single block and the third read I/O returns a single block. Virtualization software 104 can replace the dummy contents in the first read I/O with the proper contents fetched from the host swap file 234 with the second and third read I/O to form a sequence of contiguous blocks which in turn are returned to VM 106(1). If the third read I/O had returned two blocks (e.g., the page read contains two blocks), then the two blocks would be in between blocks 'C' and 'E.'

As discussed above, swap file manager 150 may reorganize the content within the host swap file and/or the guest swap file for purposes of reducing the read I/O latency by minimizing the number of read I/Os necessary to retrieve the guest content. In particular embodiments, swap file manager 150 can reorganize the guest content using a variety of methods. A first technique reorganizes content in host swap file 234 will be discussed followed by a second technique that reorganizes content in the guest swap file will be discussed.

FIG. 3C depicts an example illustrating a technique for reorganizing guest content in the host swap file 234 according to one embodiment. Reorganization of guest content in host swap file 234 can include changing the state of host swap file 234 so that blocks storing content relevant to read request for VM 106(1) appear contiguous within host swap file 234. By storing the blocks contiguously (i.e., adjacent to one another), virtualization software 104 can perform subsequent requests for the same content by retrieving the blocks from host swap file 234 using a single read request rather than multiple read requests. This in turn reduces the read I/O latency experienced by virtualization software 104 due to a fewer number of read I/Os being performed.

In one embodiment, swap file manager 150 can perform the technique before, during, or after retrieving the guest content for the read request. In one example, swap file manager 150 may analyze the write I/O requests as a hint to determine which block or blocks in host swap file 234 might be accessed in a single read request. In another embodiment, swap file manager 150 can perform the technique during or after a write request. For example, virtualization software 104 can determine that content to be paged out of PPN 201 in a write request issued by VM 106(1) includes references to content stored on host swap file 234. In response to the determination, virtualization software 104 can request swap file manager 150 to perform the technique so that referenced block or blocks appear contiguous in host swap file 234. This can reduce future read I/O latency by minimizing the number of read I/Os that are needed to retrieve the content from host swap file 234.

In some embodiments, blocks within host swap file 234 can include metadata to help the swap file manager manage content within host swap file 234. The metadata can include a swapped flag and a reference count. The swapped flag can be used to specify whether the block contains the swapped contents of a PPN and thus cannot be cleared. The reference count can be used to specify how many times the content within the block is referenced by a guest swap file. Swap file manager 150 can increment the reference count of the block every time the content within the block is referenced when paging content from the memory of a VM to a guest swap file that corresponds with the VM. Swap file manager 150 can decrement the reference count when content within the block of host swap file 234 is referenced one less time. A block of host swap file 234 can be referenced fewer times when another block of a guest swap file that references the block in host swap file 234 is overwritten by new contents thus invalidating the indirection. Similarly the block of host swap file can be referenced fewer times when the reference within the guest swap file is written out.

Here, swap file manager 150 can identify a sequence of blocks in guest swap file 214 that was written by the guest operating system. In one example, the sequence of disk blocks was written by the guest operating system as part of a single swap operation. In one embodiment, the sequence of blocks can be identified in response to a read request or write request received from a VM 106(1). Therefore, sequence of disk blocks are identified in a synchronous manner since the sequence of disk blocks are identified in response to a read or write request. In another embodiment, the sequence of blocks can be identified in an asynchronous manner. For example, swap file manager 150 can access a table that is configured to store references to sequences of blocks written in guest swap file 114. The table can be updated whenever virtualization software 104 or the guest OS writes content into guest swap file 114. When system resources allow, swap file manager 150 can query the table and identify a sequence of blocks for reorganizing. Thus, performing the reorganization is not linked to the when the read request or write request is processed. On some examples, virtualization software 104 can include a reference to a sequence of disk blocks when the sequence of disk blocks references content stored in the host swap file, thus signifying that the sequence of blocks can be reorganized by swap file manager 150.

Once the sequence of blocks are identified, swap file manager 150 can then detect that blocks 320 and 340 of the sequence of blocks both reference a disk block stored in host swap file 234. Once detected, swap file manager 150 can locate a sequence of contiguous free blocks in host swap file 234. The number of blocks in the sequence of contiguous free blocks can be same as the number of referenced blocks. Swap file manager can then copy the contents of block 320 and 340 to the sequence of contiguous blocks in host swap file 234. Copying can include allocating the sequence of contiguous blocks in host swap file 234 and copying the contents of the block 320 and 340 to the sequence of contiguous blocks.

Here, the contents of block 320 are copied to block 322 and the contents of block 340 are copied to block 342.

Once the contents have been copied, swap file manager 150 can update the metadata of the copied blocks. In one embodiment, the metadata of the blocks can be copied from the original blocks. For example, block 320 originally had swap flag set to true and a reference count of 2. Swap file manager 150 can copy this block metadata over to block 322. Once the blocks have been copied so that they are contiguous in host swap file 234, swap file manager 150 can clear the metadata of the original blocks (blocks 320 and 340). Clearing the metadata of the original blocks can signify to swap file manager 150 that the blocks can be cleared and repurposed. Lastly, swap file manager 150 can update block mapping info 212 so that the indirection to block 360 references block 322 and the indirection to block 370 references block 342. By changing the state of host swap file 234 so that the references blocks are contiguous, a future read request can retrieve the reference blocks in a single pass. For example, virtualization software 104 can realize that the blocks requested in host swap file 234 to complete a VM request are contiguous and perform a single read request to retrieve a sequence of two blocks, starting at block 322. This reduces the required read requests from three to two (one read request on the guest swap file 214 and one read request on the host swap file 234).

In some embodiments, swap file manager 150 can determine whether there are a sufficient number of blocks adjacent one of the identified blocks to store the identified blocks as a sequence of contiguous blocks before locating a sequence of contiguous free blocks in host swap file 234 that do not contain the identified blocks (as shown in FIG. 3C). If there is a sufficient number of free blocks adjacent to one of the identified blocks, swap file manager 150 can perform the copy process for at least one less block, thus saving processing time. For example if a block contiguous to block 320 is available, swap file manager 150 can copy the contents of block 340 to the contiguous block while leaving block 320 alone. This reduces the number of blocks that are copied in host swap file 234 from two to one.

FIG. 3D depicts an example illustrating a technique for reorganizing content in the guest swap file. Reorganization of content in guest swap file 214 can include changing the state of guest swap file 214 so that dummy blocks are replaced with the content they reference. As a result, all of the content for a read request is stored locally in guest swap file 214. By storing all of the content for the read request in guest swap 214, virtualization software 104 can perform subsequent read requests by retrieving the blocks using a single read I/O to guest swap file 214, thus eliminating the read I/Os to host swap file 234. Fewer read I/Os needed may translate to a reduction to the read I/O latency experienced by virtualization software 104.

In one embodiment, this technique can be performed before, during, or after a read request. For example, virtualization software 104 can request that the technique be performed by swap file manager 150 when it discovers that the content retrieved from guest swap file 214 includes dummy content. In one example, the technique can be performed before retrieving content from guest swap file 214 so that only a single read request is needed to retrieve the content (i.e., no longer need to issue a read request to host swap file 234). In another example, a first read request can be issued to guest swap file 214 while a second and third read request is issued to host swap file 234. Once the content has been retrieved, swap file manager 150 can replace the dummy content in the guest swap file 214 with the proper contents. In another embodiment, this technique can be performed during or after a write request. While processing a page out request for VM 106(1), virtualization software 104 can discover that content for PPN 201 resides in host swap file 234. In one example, swap file manager 150 can perform the technique during the write request so that dummy content is not written out into guest swap file 214. In another example, the technique can be performed after the page out request is processed. In yet another embodiment, this technique can be performed during a write request. While processing a page out request for VM 106(1), virtualization software 104 can identify blocks that already exist in the host swap file. VM 106(1) can proceed in processing the page out request by writing out the content (which includes dummy blocks for content that exists in the host swap file) to the guest swap file. As the page out request is being processed, virtualization software 104 can schedule a defragmentation job to copy content from the host swap file to the dummy blocks in the guest swap file so that the content corresponding to the read are stored in a contiguous sequence of blocks. The defragmentation job can be performed simultaneously with the job performing the page out request. In some embodiments, the timing in which the technique is performed can depend on system conditions such as the current load on the virtualization software, load on physical disk, and load on the I/O subsystem. In fact, virtualization software 104 or swap file manager 150 can select a particular technique to apply based on the system conditions.

Here, virtualization software 104 can determine that blocks 320 and 340 are referenced by a sequence of blocks in guest swap file 214. The sequence of blocks can be identified in response to a write request received from a VM. Once the determination is made, virtualization software 104 can call swap file manager 150 to copy the contents of block 320 to block 360 (e.g., the dummy block that was referencing the contents of block 320) and copy the contents of block 340 to block 370 (e.g., the dummy block that was referencing the contents of block 340). Swap file manager 150 can also update the metadata of blocks 320 and 340 to reflect the removal of the indirection between blocks 360 and 320 and the removal of the indirection between blocks 370 and 340. For example, the reference count of block 320 can be decremented to 1. The swapped flag remains set to true since another guest swap file is still referencing block 320. Similarly, the reference count of block 340 is decremented to zero. Swap file manager 150 can determine that block 340 is no longer being referenced and thus can be cleared or repurposed. In some embodiments, virtualization software 104 or swap file manager 150 can update block mapping info 212 to remove any indirections between blocks 360 and 320 or blocks 370 and 340.

Figure 4:
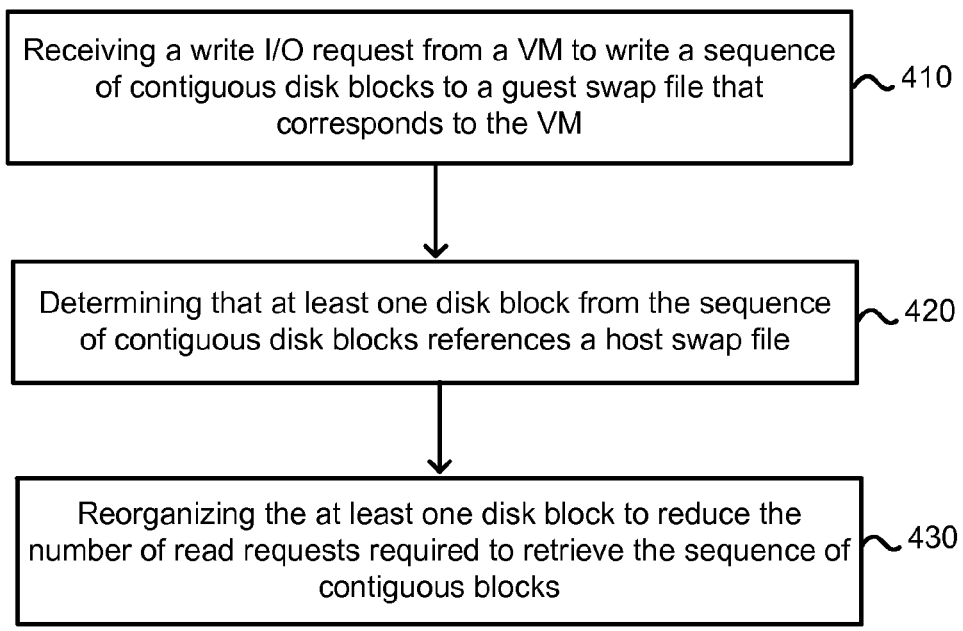
FIG. 4 depicts an example of a method to perform a write I/O request according to one embodiment.

FIG. 4 depicts a simplified flowchart 400 of a method to process a write I/O request according to one embodiment. At 410, virtualization software 104 receives a write I/O request from VM 106(1) to write a sequence of contiguous disk blocks to a guest swap file 214 that corresponds to VM 106(1). In one example, the write I/O request can be a request from the VM 106(1) to page out content from guest physical memory 210 to guest swap file 214.

At 420, once the write I/O request is received, virtualization software 104 determines that at least one disk block from the sequence of contiguous disk blocks references host swap file 234. In one embodiment, virtualization software 104 makes this determination by detecting one or more dummy blocks within the sequence of contiguous disk blocks. The dummy block can store an indirection that maps the dummy block to a reference block in host swap file 234. In another embodiment, virtualization software 104 makes this determination based on the block mapping info 212 that corresponds to guest swap file 214. Block mapping info 212 may include an indirection that maps a block from the sequence of contiguous blocks to a reference block in host swap file 234.

At 430, virtualization software 104 instructs the swap file manager to reorganize the at least one disk block to reduce the number of read requests required to retrieve the sequence of contiguous blocks. In one embodiment, this can include swap file manager 150 changing the state of host swap file 234 by relocating a first disk block referenced by the sequence of contiguous blocks and a second disk block referenced by the sequence of contiguous blocks so that they are contiguous. This allows the first disk block and the second disk block to be retrieved using a single read request. In another embodiment, this can include changing the state of both guest swap file 214 and host swap file 234. In guest swap file 214, swap file manager 150 can import content from a reference block of host swap file 234 to a dummy block in the sequence of contiguous blocks. This reduces the number of blocks that need to be retrieved from host swap file 234 by one. In host swap file 234, swap file manager 150 can update the metadata of the reference block to reflect that the indirection for the dummy block is no longer needed since the content has been imported into guest swap file 214. In some examples, swap file manager 150 can clear or repurpose the reference block when the reference count is zero.

Figure 5:
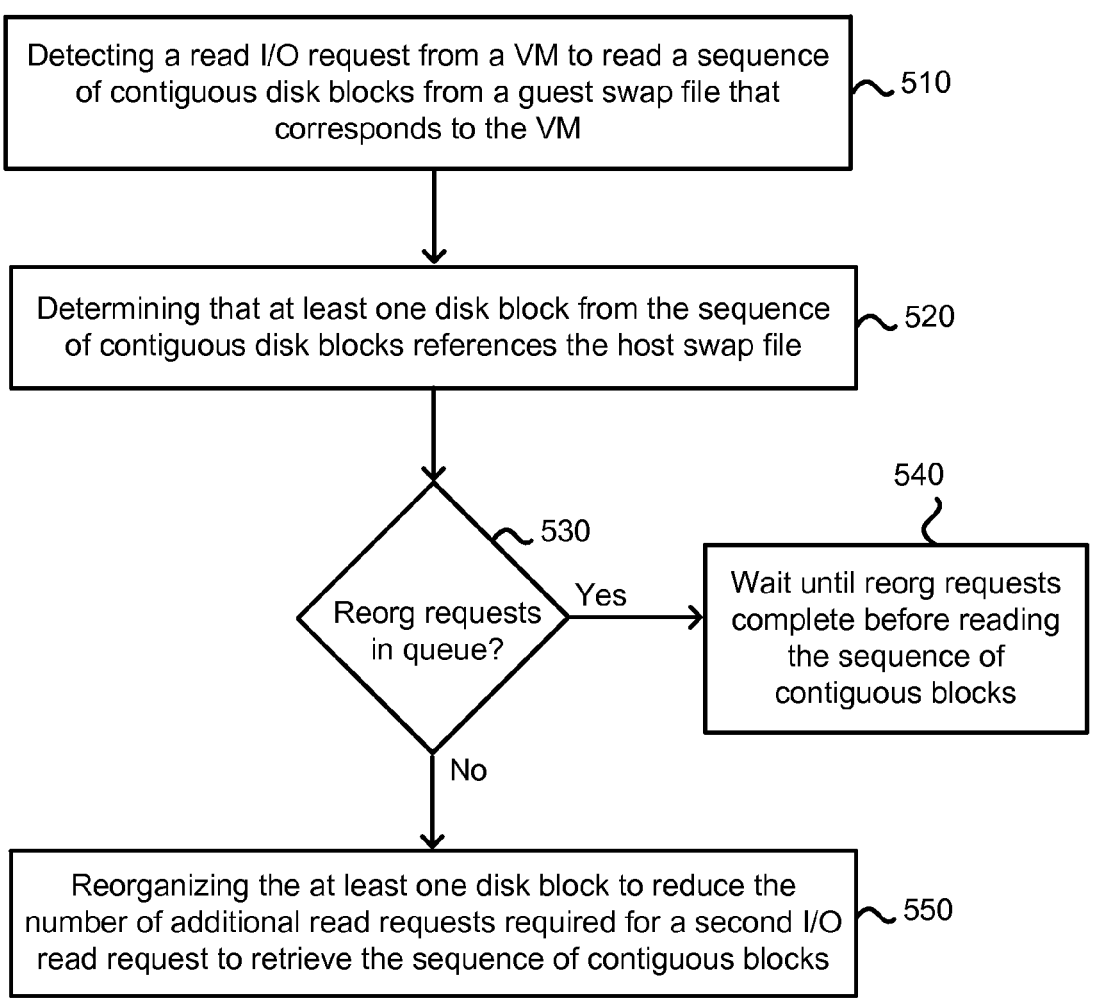
FIG. 5 depicts an example of a method to perform a read I/O request according to one embodiment.

FIG. 5 depicts a simplified flowchart 500 of a method to process a read I/O request according to one embodiment. At 510, virtualization software 104 detects a read I/O request from VM 106(1) to read a sequence of contiguous disk blocks from guest swap file 214 that corresponds to VM 106(1). In one example, the read I/O request can originate from VM 106(1).

After detecting the read I/O request, virtualization software 104 determines that at least one disk block from the sequence of contiguous disk blocks references host swap file 234 at 520. This determination can be the same or substantially similar as step 420 in FIG. 4.

At 530, the virtualization software 104 can determine whether there are pending requests in the queue for swap file manager 150. If there is a request in the queue, virtualization software 104 can wait until the swap file manager 150 reorganizes the content before reading the sequence of contiguous blocks at 540. By waiting until swap file manager 150 has reorganized the swap files, virtualization software 104 can retrieve the content using fewer read requests, thereby reducing read I/O latency. In some embodiments, virtualization software 104 can assign a request to the swap file manager 150 with a higher priority when a read I/O request depends on the completion of the request.

Alternatively if there are no pending requests in the queue for swap file manager 150, swap file manager 150 can reorganize the content in the swap files to reduce the number of additional read requests required for a second read I/O request to retrieve the sequence of contiguous blocks at 550. The techniques that can be applied here can be the same or similar to those applied in step 430 of FIG. 4.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A computer-implemented method for reducing the latency of an anticipated read of disk blocks from a swap file in a virtualized environment, the environment including: a host swap file maintained by a host operating system and a virtual machine (VM) that includes a guest swap file maintained by a guest operating system, the method comprising:

identifying, in the guest swap file, a sequence of disk blocks that was written by the guest operating system;

detecting, within the sequence of disk blocks, a first reference to a first disk block stored in the host swap file;

detecting, within the sequence of disk blocks, a second reference to a second disk block stored in the host swap file; and moving the second disk block to a location in the host swap file adjacent to the first disk block.

2. The computer-implemented method of claim 1, wherein the sequence of disk blocks was written by the guest operating system as part of a single swap operation.

3. The computer-implemented method of claim 1, wherein the VM includes a first virtual machine disk (VMDK) and the host swap file includes a second VMDK and the second VMDK is a peer of the first VMDK.

4. The computer-implemented method of claim 1, further comprising:

moving the first disk block to another location in the host swap file capable of storing the first disk block and the second disk block as adjoining blocks before moving the second disk block.

5. The computer-implemented method of claim 1, wherein moving the second disk block comprises:

allocating, in the host swap file, a new disk block that is adjacent to the first disk block; and copying contents of the second disk block to the new disk block.

6. The computer-implemented method of claim 5, wherein moving the second disk block further comprises:

decrementing a reference count associated with the second disk block; and clearing the second disk block so that the second disk block can be repurposed when the reference count reaches zero.

7. The computer-implemented method of claim 1, wherein detecting the second reference to the second disk block stored in the host swap file comprises:

identifying the second reference within the sequence of blocks; and determining that the second reference references the second disk block based on a mapping table.

8. The computer-implemented method of claim 7, wherein moving the second disk block further comprises:
updating the mapping table so that the second reference points to the location in the host swap file adjacent to the first disk block instead of the second disk block.

9. The computer-implemented method of claim 1, wherein a table is configured to store references to sequences of disk blocks written in the guest swap and wherein identifying the sequence of disk blocks comprises determining that the table includes a third reference to the sequence of disk blocks.

10. A non-transitory computer readable storage medium containing instructions for reducing the latency of an anticipated read of disk blocks from a swap file in a virtualized environment, the environment including: a host swap file maintained by a host operating system and a virtual machine (VM) that includes a guest swap file maintained by a guest operating system, the instructions when executed, control a computer system to be configured for:
identifying, in the guest swap file, a sequence of disk blocks that was written by the guest operating system;
detecting, within the sequence of disk blocks, a first reference to a first disk block stored in the host swap file;
detecting, within the sequence of disk blocks, a second reference to a second disk block stored in the host swap file; and
moving the second disk block to a location in the host swap file adjacent to the first disk block.

11. The non-transitory computer readable storage medium of claim 10, wherein the sequence of disk blocks was written by the guest operating system as part of a single swap operation.

12. The non-transitory computer readable storage medium of claim 10, wherein the VM includes a first virtual machine disk (VMDK) and the host swap file includes a second VMDK and the second VMDK is a peer of the first VMDK.

13. The non-transitory computer readable storage medium of claim 10, further comprising:
moving the first disk block to another location in the host swap file capable of storing the first disk block and the second disk block as adjoining blocks before moving the second disk block.

14. The non-transitory computer readable storage medium of claim 10, wherein moving the second disk block comprises:
allocating, in the host swap file, a new disk block that is adjacent to the first disk block; and
copying contents of the second disk block to the new disk block.

15. The non-transitory computer readable storage medium of claim 14, wherein moving the second disk block further comprises:
decrementing a reference count associated with the second disk block; and
clearing the second disk block so that the second disk block can be repurposed when the reference count reaches zero.

16. The non-transitory computer readable storage medium of claim 10, wherein detecting the second reference to the second disk block stored in the host swap file comprises:
identifying the second reference within the sequence of blocks; and
determining that the second reference references the second disk block based on a mapping table.

17. The non-transitory computer readable storage medium of claim 16, wherein moving the second disk block further comprises:
updating the mapping table so that the second reference points to the location in the host swap file adjacent to the first disk block instead of the second disk block.

18. The non-transitory computer readable storage medium of claim 10, wherein a table is configured to store references to sequences of disk blocks written in the guest swap and wherein identifying the sequence of disk blocks comprises determining that the table includes a third reference to the sequence of disk blocks.

19. An apparatus for reducing the latency of an anticipated read of disk blocks from a swap file in a virtualized environment, the environment including: a host swap file maintained by a host operating system and a virtual machine (VM) that includes a guest swap file maintained by a guest operating system, the apparatus comprising:
one or more computer processors; and
a non-transitory computer-readable storage medium comprising instructions, that when executed, control the one or more computer processors to be configured for:
identifying, in the guest swap file, a sequence of disk blocks that was written by the guest operating system;
detecting, within the sequence of disk blocks, a first reference to a first disk block stored in the host swap file;
detecting, within the sequence of disk blocks, a second reference to a second disk block stored in the host swap file; and
moving the second disk block to a location in the host swap file adjacent to the first disk block.

20. The apparatus of claim 19, wherein the sequence of disk blocks was written by the guest operating system as part of a single swap operation.

21. The apparatus of claim 19, wherein the VM includes a first virtual machine disk (VMDK) and the host swap file includes a second VMDK and the second VMDK is a peer of the first VMDK.

22. The apparatus of claim 19, further comprising:
moving the first disk block to another location in the host swap file capable of storing the first disk block and the second disk block as adjoining blocks before moving the second disk block.

23. The apparatus of claim 19, wherein moving the second disk block comprises:
allocating, in the host swap file, a new disk block that is adjacent to the first disk block; and
copying contents of the second disk block to the new disk block.

24. The apparatus of claim 23, wherein moving the second disk block further comprises:
decrementing a reference count associated with the second disk block; and
clearing the second disk block so that the second disk block can be repurposed when the reference count reaches zero.

25. The apparatus of claim 19, wherein detecting the second reference to the second disk block stored in the host swap file comprises:
identifying the second reference within the sequence of blocks; and
determining that the second reference references the second disk block based on a mapping table.

26. The apparatus of claim 25, wherein moving the second disk block further comprises:
updating the mapping table so that the second reference points to the location in the host swap file adjacent to the first disk block instead of the second disk block.

27. The apparatus of claim 19, wherein a table is configured to store references to sequences of disk blocks written in the guest swap and wherein identifying the sequence of disk blocks comprises determining that the table includes a third reference to the sequence of disk blocks.

* * * * *